US007962895B2

(12) United States Patent
Liu (10) Patent No.: US 7,962,895 B2
(45) Date of Patent: Jun. 14, 2011

(54) LANGUAGE FOR BINDING SCALABLE VECTOR GRAPHICS ELEMENTS TO JAVA CLASSES

(75) Inventor: Peter T. Liu, San Ramon, CA (US)

(73) Assignee: Oracle America, Inc., Redwood City, CA (US)

( * ) Notice: Subject to any disclaimer, the term of this patent is extended or adjusted under 35 U.S.C. 154(b) by 1363 days.

(21) Appl. No.: 11/490,651

(22) Filed: Jul. 20, 2006

(65) Prior Publication Data

US 2008/0127153 A1    May 29, 2008

(51) Int. Cl.
G06F 9/44      (2006.01)
G06F 17/00    (2006.01)
G06F 3/00      (2006.01)

(52) U.S. Cl. ........ 717/116; 717/114; 717/108; 717/165; 715/234; 715/700; 719/328

(58) Field of Classification Search .................. None
See application file for complete search history.

(56) References Cited

U.S. PATENT DOCUMENTS

| | | | |
|---|---|---|---|
| 6,675,230 B1* | 1/2004 | Lewallen | 719/328 |
| 6,854,123 B1* | 2/2005 | Lewallen | 719/328 |
| 6,981,211 B1* | 12/2005 | Claussen et al. | 715/239 |
| 7,210,095 B1* | 4/2007 | Mor | 715/234 |
| 7,486,294 B2* | 2/2009 | Beda et al. | 345/473 |
| 7,496,828 B2* | 2/2009 | Relyea et al. | 715/200 |
| 7,543,286 B2* | 6/2009 | Relyea et al. | 717/162 |
| 7,669,183 B2* | 2/2010 | Bowman et al. | 717/113 |
| 7,712,025 B2* | 5/2010 | Roessler | 715/234 |
| 2003/0121000 A1* | 6/2003 | Cooper et al. | 715/513 |
| 2003/0126557 A1* | 7/2003 | Yardumian et al. | 715/513 |
| 2003/0163603 A1* | 8/2003 | Fry et al. | 709/328 |
| 2004/0111672 A1* | 6/2004 | Bowman et al. | 715/513 |
| 2004/0111673 A1* | 6/2004 | Bowman et al. | 715/513 |
| 2004/0177094 A1* | 9/2004 | Jacobs et al. | 707/104.1 |
| 2005/0015732 A1* | 1/2005 | Vedula et al. | 715/805 |
| 2005/0022116 A1* | 1/2005 | Bowman et al. | 715/513 |
| 2005/0108629 A1* | 5/2005 | Relyea et al. | 715/513 |
| 2005/0132279 A1* | 6/2005 | Relyea et al. | 715/513 |
| 2005/0155027 A1* | 7/2005 | Wei | 717/162 |

(Continued)

OTHER PUBLICATIONS

Christophe Jolif, "Bringing SVG Power to Java Applications", Jan. 2003, retrieved from <http://java.sun.com/developer/technicalArticles/GUI/svg/>, total pp. 15.*

(Continued)

*Primary Examiner* — Tuan Q Dam
*Assistant Examiner* — Marina Lee
(74) *Attorney, Agent, or Firm* — Osha • Liang LLP (57) ABSTRACT

According to a technique described herein, a binding document comprises one or more "<bind>" element instances. Each "<bind>" element instance indicates an association between (a) an SVG element instance and (b) a class. When a binding's name is passed to a "createFromTemplate( )" method, the method processes all of the "<bind>" element instances that are associated within that name. For each such "<bind>" element instance, the method (a) creates, in an SVG DOM tree, a clone of a node that corresponds to an SVG element instance indicated in that "<bind>" element instance, (b) instantiates an object that is an instance of a class that is indicated in that "<bind>" element instance, and (c) stores data that establishes a binding between the clone node and the object. Methods of the object can be invoked to affect and/or alter attributes of the clone node to which the object is bound.

24 Claims, 2 Drawing Sheets

U.S. PATENT DOCUMENTS

| | | | |
|---|---|---|---|
| 2006/0005119 A1* | 1/2006 | Karun et al. | 715/513 |
| 2007/0089048 A1* | 4/2007 | Lacey et al. | 715/505 |
| 2007/0242082 A1* | 10/2007 | Lathrop et al. | 345/619 |
| 2008/0127153 A1* | 5/2008 | Liu | 717/162 |

OTHER PUBLICATIONS

Hunter et al., "Easy Java/XML itergration with JDOM, Part 1", May 18, 2000, retrieved from <http://www.javaworld.com/javaworld/jw-05-2000/jw-0518-jdom.html>, total pp. 28.*

Brian Venn, Add interactivity to your SVG, Aug. 27, 2003, retrieved from <http://www.ibm.com/developerworks/library/x-svgint/>, total pp. 11.*

Duignan et al., "Evaluating Scalable Vector Graphics for use in Software Visualisation", 2003, retrieved from <http://crpit.com/confpapers/CRPITV24Duignan.pdf>, total pp. 10.*

Elliotte Rusty Harold, "Processing XML with Java", 2001, 2002, retrieved from <http://www.cafeconleche.org/books/xmljava/chapters/>, total pp. 21.*

Alex Chaffee, "Sever-Side Java: Using XML and JSP together", Mar. 2, 2000, retrieved from <http://www.javaworld.com/jw-03-2000/jw-0331-ssj-jspxml.html>, total pp. 9.*

* cited by examiner

LANGUAGE FOR BINDING SCALABLE VECTOR GRAPHICS ELEMENTS TO JAVA CLASSES

BACKGROUND

Computerized development tools are increasingly becoming more visually oriented. For example, information can be displayed in a graph instead of as text. An easy-to-use shape description language helps a tool designer to more easily provide a visual aspect to computerized presentations. Scalable Vector Graphics (SVG) is an Extensible Markup Language (XML) language for describing two-dimensional graphics. SVG provides a good foundation for visual expression because SVG allows designers to describe visual elements in an XML format.

However, several limitations affect SVG. SVG visual elements are static, in that there are no behaviors associated with SVG visual elements. Also, the programming model for SVG is based on the XML Document Object Model (DOM). Consequently, SVG graphics are manipulated through the manipulation of nodes in an SVG DOM tree. No hooks exist for attaching executable code to the SVG DOM tree.

SUMMARY

According to a technique described herein, a binding document comprises one or more "<bind>" element instances. Each "<bind>" element instance indicates an association between (a) an SVG element instance and (b) a class. When a binding's name is passed to a "createFromTemplate( )" method, the method processes all of the "<bind>" element instances that are associated within that name. For each such "<bind>" element instance, the method (a) creates, in an SVG DOM tree, a clone of a node that corresponds to an SVG element instance indicated in that "<bind>" element instance, (b) instantiates an object that is an instance of a class that is indicated in that "<bind>" element instance, and (c) stores data that establishes a binding between the clone node and the object. Methods of the object can be invoked to affect and/or alter attributes of the clone node to which the object is bound.

DETAILED DESCRIPTION OF EMBODIMENT(S)

Overview

According to a technique described herein, a binding document expresses bindings between SVG element instances and JAVA classes. The binding document is composed in a binding language that is a subset of XML. In one embodiment of the invention, the binding document comprises one or more "<template>" element instances. Each "<template>" element instance indicates a name for a binding. Additionally, each "<template>" element instance encloses one or more "<bind>" element instances. Each "<bind>" element instance indicates an association between (a) an SVG element instance, defined in an SVG document, and (b) a JAVA class in an API, or "framework."

In one embodiment of the invention, when the name of a binding is passed as a parameter to an invocation of a "createFromTemplate( )" method, the "createFromTemplate( )" method reads and processes all of the "<bind>" element instances that are enclosed within the "<template>" element instance that indicates that name. For each such "<bind>" element instance, the "createFromTemplate( )" method creates, in an SVG DOM tree, a clone of a node that corresponds to an SVG element instance indicated in that "<bind>" element instance. Additionally, for each such "<bind>" element instance, the "createFromTemplate( )" method instantiates an object that is an instance of a JAVA class that is indicated in that "<bind>" element instance. For each such "<bind>" element instance, the "createFromTemplate( )" method stores data that establishes a binding between the clone node and the object. Methods of the object can be invoked to affect and/or alter attributes of the clone node to which the object is bound.

Example SVG Document

The SVG Specification defines several different element types, such as "<g>" (which stands for "group"), "<rect>," "<circle>," and "<text>." Each element type may have one or more attributes (e.g., "id"). An example SVG document is shown below.

```
<svg>
    <g id="BoxLabel">
        <rect id="Box" x="-25" y="-10" width="50" height="20"
            fill="white" stroke="red"/>
        <text id="Label" x="0" y="4" text-anchor="middle"
            font-size="9" fill="black">
            Node
        </text>
    </g>
    <g id="CircleLabel">
        <circle id="Circle" cx="0" cy="0" r="15" fill="white"
            stroke="red"/>
        <text id="Label" x="0" y="4" text-anchor="middle"
            font-size="9" fill="black>
        </text>
    </g>
</svg>
```

There are SVG element types, and then there are "instances" of those SVG element types. The foregoing SVG document comprises multiple instances of the same SVG element type. For example, there are two instances of the "<g>" SVG element type. One instance of this SVG element type has an "id" attribute value of "BoxLabel," and one instance of this SVG element type has an "id" attribute value of "CircleLabel."

The foregoing SVG document may be provided as input to an SVG engine. In response to receiving the SVG document as input, an SVG engine may render and display (a) a 50 pixel by 20 pixel white box with a red border and a text label that reads "Node," as described by the SVG element instance whose "id" attribute value is "BoxLabel," and (b) a white circle with a radius of 15 pixels and a blank text label, as described by the SVG element instance whose "id" attribute value is "CircleLabel."

The foregoing SVG document describes only two shapes: the box (defined by the SVG element instance whose "id" attribute value is "BoxLabel") and the circle (defined by the SVG element instance whose "id" attribute value is "Circle- Label"). A programmer might want the SVG engine to render and display multiple instances of these shapes. Traditionally, a programmer who wanted to accomplish this using SVG would need to use a document editor to make a separate copy of the appropriate SVG code for each instance desired, paste those multiple copies into the SVG document, and manually modify the attributes (e.g., coordinates, size, color, text label) of the SVG code for each instance desired. For example, if the programmer wanted the SVG engine to render 5 boxes and 3 circles, then the programmer would need to make 4 additional copies of the SVG code for the SVG element instance whose "id" attribute value is "BoxLabel," and 2 additional copies of the SVG code for the SVG element instance whose "id" attribute value is "CircleLabel." In order to cause the shapes to not overlap each other, the programmer would need to modify the coordinate attribute values for each copy. If the programmer wanted the labels of the shapes to differ, then the programmer would need to edit, manually, the text between the "<text>" tags in each copy.

The Visdev Framework

"Visdev" is a JAVA-based visual framework. In the Visdev Framework, shapes such as boxes and circles are represented by "design elements." Design elements may be imagined as "wrappers" around instances of SVG element nodes that are contained in an SVG DOM tree. Design elements provide a set of Application Programming Interfaces (APIs) through which a JAVA program can manipulate the SVG element nodes around which the design elements are "wrapped."

According to one embodiment of the invention, design elements correspond to SVG element instances. In one embodiment of the invention, each different design element is implemented by a different JAVA class. Thus, in one embodiment of the invention, SVG element instances correspond to JAVA classes.

According to one embodiment of the invention, the JAVA classes do not actually comprise any code for causing the shapes to be rendered or displayed. Instead, the information that generally describes the shapes that are to be rendered and displayed remains within an SVG document. This allows programmers to continue to describe shapes using the easy-to-use SVG language. Programmers are not forced to write custom JAVA code that actually renders and displays shapes. Instead, programmers can merely write JAVA code that alters the attribute values of SVG element instances so that the shapes corresponding to those SVG element instances exhibit desired behavior. Thus, the shapes become "dynamic" rather than "static."

According to one embodiment of the invention, JAVA classes in the Visdev Framework can extend other JAVA classes in the Visdev Framework, thereby inheriting the methods and variables of the extended JAVA classes.

Example Binding Language

As is described above, in one embodiment of the invention, JAVA classes correspond to SVG element instances. According to one embodiment of the invention, this correspondence is established through a "binding document" that describes associations, or, in other words, "bindings," between SVG element instances and JAVA classes. A binding document describes these bindings through a "binding language" that is described herein. In one embodiment of the invention, the binding language is a subset of the XML language.

An example binding document, which is composed in the example binding language, is shown below. In one embodiment of the invention, the binding document is located in a separate file from the SVG document to which the binding document refers.

```
<v:defs xmlns="http://www.sun.com/2005/visdev">
    <template id="BoxLabelTemplate">
        <bind svg-ref="BoxLabel" class="TextLabelDesignElement">
            <bind svg-ref="Label" class="TextLabelDesignElement"
            field="label"/>
        </bind>
    </template>
    <template id="CircleLabelTemplate">
        <bind svg-ref="CircleLabel" class="TextLabelDesignElement">
            <bind svg-ref="Label" class="TextLabelDesignElement"
            field="label"/>
        </bind>
    </template>
</v:defs>
```

The foregoing binding document comprises two notable element types: the "<template>" element type and the "<bind>" element type, which are among the primitives of the binding language. In the foregoing binding document, there are two instances of the "<template>" element type: one whose "id" attribute value is "BoxLabelTemplate," and one whose "id" attribute value is "CircleLabelTemplate." Additionally, there are four instances of the "<bind>" element type.

Each "<template>" element instance may enclose, within its opening and closing tags, one or more "<bind>" element instances. Additionally, each "<bind>" element instance may enclose, within its opening and closing tags, one or more other "<bind>" element instances that are subordinate to the "<bind>" element instance within whose tags they are enclosed.

According to one embodiment of the invention, each "<template>" element instance has an "id" attribute whose attribute value identifies that specific "<template>" element instance. According to one embodiment of the invention, each "<bind>" element instance has an "svg-ref" attribute whose attribute value identifies an SVG element instance in an SVG document. Additionally, according to one embodiment of the invention, each "<bind>" element instance also has either (a) a "class" attribute whose value identifies a JAVA class in the Visdev Framework, or (b) a "field" attribute whose value identifies a variable (or "field") of a JAVA class in the Visdev Framework. According to one embodiment of the invention, a "<bind>" element instance may have both the "class" attribute and the "field" attribute. In one embodiment of the invention, if an particular "<bind>" element instance has a "field" attribute but not a "class" attribute, then the particular "<bind>" element is assumed to have a "class" attribute whose attribute value is the same as the attribute value of a "class" attribute of another "<bind>" element that encloses the particular "<bind>" element.

In the foregoing binding document, the first "<template>" element instance's "id" attribute value is "BoxLabelTemplate." This signifies that a binding called "BoxLabelTemplate" should be created when binding occurs. This "<template>" element instance encloses a "<bind>" element instance whose "svg-ref" attribute value is "BoxLabel" and whose "class" attribute value is "TextLabelDesignElement." This signifies that the "BoxLabelTemplate" binding should include a binding between (a) a "first level" SVG element instance whose "id" attribute value is "BoxLabel" and (b) a "TextLabelDesignElement" JAVA class in the Visdev Framework. This "<bind>" element instance encloses yet another "<bind>" element instances whose "svg-ref" attribute value is "Label," whose "class" attribute value is "TextLabelDesignElement," and whose "field" attribute is "label." This signifies that the "BoxLabelTemplate" binding should also include a binding between (a) a "second level" SVG element instance that is enclosed within the "first level" SVG element instance and whose "id" attribute value is "Label" and (b) a "label" variable of the "TextLabelDesignElement" JAVA class in the Visdev Framework.

Similarly, in the foregoing binding document, the second "<template>" element instance's "id" attribute value is "CircleLabelTemplate." This signifies that a binding called "CircleLabelTemplate" should be created when binding occurs. This "<template>" element instance encloses a "<bind>" element instance whose "svg-ref" attribute value is "CircleLabel" and whose "class" attribute value is "TextLabelDesignElement." This signifies that the "CircleLabelTemplate" binding should include a binding between (a) a "first level" SVG element instance whose "id" attribute value is "CircleLabel" and (b) a "TextLabelDesignElement" JAVA class in the Visdev Framework. This "<bind>" element instance encloses yet another "<bind>" element instances whose "svg-ref" attribute value is "Label," whose "class" attribute value is "TextLabelDesignElement," and whose "field" attribute value is "label." This signifies that the "CircleLabelTemplate" binding should also include a binding between (a) a "second level" SVG element instance that is enclosed within the "first" SVG element instance and whose "id" attribute value is "Label" and (b) a "label" variable of the "TextLabelDesignElement" JAVA class in the Visdev Framework.

Example Visdev JAVA Class

As is discussed above, in one embodiment of the invention, a binding document expresses bindings between SVG element instances and JAVA classes in the Visdev Framework. Also as is discussed above, the JAVA classes in the Visdev Framework can be designed to alter the attribute values of SVG element instances so that the shapes corresponding to those SVG element instances exhibit desired behavior.

When an SVG engine interprets an SVG document, the SVG engine creates an SVG DOM tree that comprises SVG element nodes that correspond to the SVG element instances in the SVG document. When the attribute values of the SVG element nodes are altered, the displayed shapes that represent those SVG element nodes are automatically updated to reflect the new attribute values. For example, if a JAVA class changes the attribute value of a "label" attribute of an SVG element node in an SVG DOM tree, then the text displayed within a shape that represents that SVG element node will change automatically to reflect the new attribute value.

An example JAVA class that might be included in an implementation of the Visdev Framework is shown below.

```
public class TextLabelDesignElement extends CompositeDesignElement {
    public static int index = 0;
    private TextDesignElement label;
    protected void initialize(AbstractDesignView view) {
        String text = label.getText( ).trim( );
        label.setText(text + " " + (index++));
    }
}
```

In the previous example, the binding document expressed a binding named "BoxLabelTemplate." The "BoxLabelTemplate" binding included a binding between (a) the SVG element instance whose "id" attribute value is "BoxLabel" and (b) the "TextLabelDesignElement" JAVA class shown above. This "BoxLabelTemplate" binding also included a binding between (a) the SVG element instance whose "id" attribute value is "Label" (and which is also a "child" SVG element instance of the SVG element instance whose "id" attribute value is "BoxLabel") and (b) the "label" variable of the "TextLabelDesignElement" JAVA class shown above.

According to one embodiment of the invention, the Visdev Framework includes a class called "AbstractDesignView" that is a superclass (but not necessarily an immediate superclass) of all other classes in the Visdev Framework. An application program that uses the Visdev Framework instantiates an instance of the "AbstractDesignView" class. The "AbstractDesignView" class defines a method called "createFromTemplate( )." The "createFromTemplate( )" method accepts, as a parameter, the name of a binding (e.g., "BoxLabelTemplate"). The application program invokes this method of the instance of the "AbstractDesignView" class.

When invoked, the "createFromTemplate( )" method reads the binding document. The method locates a "<template>" element instance whose "id" attribute value matches the name that was passed to the method as a parameter—in this example, "BoxLabelTemplate." The located "<template>" element instance encloses one or more first-level "<bind>" element instances. For each such first-level "<bind>" element instance, the "createFromTemplate( )" method (a) reads the attribute value of the "svg-ref" attribute of that "<bind>" element instance (the "svg-ref value"), (b) locates, in the SVG document, an SVG element instance whose "id" attribute value matches the svg-ref value (e.g., "BoxLabel"), (c) creates, in the SVG DOM tree, a "clone" node for that SVG element instance, (d) reads the attribute value of the "class" attribute of that "<bind>" element instance (the "class value"), (e) instantiates (in one embodiment of the invention, using reflection) an object that is an instance of the class (in the Visdev Framework) whose class name matches the class value (e.g., "TextLabelDesignTemplate"), and (f) stores, in memory, data that establishes an association, or binding, between the "clone" node (e.g., a clone of the "BoxLabel" SVG element node) and the object.

In one embodiment of the invention, when the "clone" node for an SVG element instance is created as described above, "clone" nodes are also created for each of that SVG element instance's "descendant" SVG element instances in the SVG DOM tree. In one embodiment of the invention, for each first-level "<bind>" element instance enclosed by the "<template>" element instance, the "createFromTemplate( )" method recursively establishes bindings between the "clone" nodes for the child "<bind>" element instances enclosed by that first-level "<bind>" element instance, if any, and the appropriate variables (indicated by the "field" attribute value of the child "<bind>" element instance) of the object that has been bound to that "clone" node for the first-level "<bind>" element instance. If those child "<bind>" element instances enclose any child "<bind>" element instances, then the "createFromTemplate( )" method recursively does the same for those child "<bind>" element instances, and so on. Thus, in the above example, an SVG DOM clone node for the "BoxLabel" SVG element instance is bound to a "TextLabelDesignElement" object, and a "child" SVG DOM clone node for the "Label" SVG element instance is bound to the "label" variable of the "TextLabelDesignElement" object.

In one embodiment of the invention, when the "createFromTemplate( )" method creates the clone nodes in the SVG DOM tree, the display is automatically refreshed to show shapes that correspond to those clone nodes. In one embodiment of the invention, when the "createFromTemplate( )" method instantiates an object of the appropriate class (as indicated by the "class" attribute value of the "<bind>" element instance), the "createFromTemplate( )" method also invokes the "initializes" method of that object. Following the example of the "TextLabelDesignElement" class shown above, when the "initialize( )" method of an object of that class is invoked, the "initialize( )" method (a) increments a static variable "index" that is shared by all objects of that class and (b) changes the value of the dynamic "label" variable of that object to reflect the incremented value of the "index" variable.

Thus, in the above example, each time that "createFromTemplate(BoxLabelTemplate)" is invoked, a new "BoxLabel" SVG node is created in the SVG DOM tree and displayed, and that SVG node's label is updated to reflect a next sequentially-occurring index value. Thus, the JAVA class "TextLabelDesignElement" adds behavior to the "BoxLabel" SVG node.

If "createFromTemplate(CircleLabelTemplate)" were to be invoked, then a new "CircleLabel" SVG node would be created in the SVG DOM tree and displayed, and that SVG node's label also would be updated to reflect the next sequentially-occurring index value, since, in the above example, "CircleLabel" is also bound to the "TextLabelDesignElement" class.

Complex Design Elements

In one embodiment of the invention, the binding language also allows instances of other templates to be composited into a complex design element. For example, the following class might be defined in the Visdev Framework:

```
public class MultiLabelDesignElement extends
CompositeDesignElement {
    private collection<TextLabelDesignElement> labels;
    public void addLabel(TextLabelDesignElement label) {
        appendChild(label);
        labels.add(label);
    }
    public void setBindingAttributes(Binding binding) {
        //attributes are interpreted here
    }
}
```

The class above can be used to hold multiple instances of "TextLabelDesignElement" that are composited together. In the above class, the "appendChild( )" method is an API method of "CompositeDesignElement." When invoked, "appendChild( )" appends a new specified SVG node to the SVG DOM tree.

The following fragment of a binding document allows an instance of "MultiLabelDesignElement" to be created. When created, the object will contain an instance of the "BoxLabelTemplate" and the "CircleLabelTemplate":

```
<template id= "MultiLabelTemplate">
    <bind template-ref="BoxLabelTemplate" method="addLabel"/>
    <bind template-ref="CircleLabelTemplate" method="addLabel"/>
</template>
```

In the above example, instead of referencing an SVG element instance, the "<bind>" element instances reference an entire "<template>" element instance as previously defined in the binding document. This causes instances of both the "BoxLabelTemplate" and the "CircleLabelTemplate" to be created. The "method" attribute of the "<bind>" element instance indicates to the "createFromTemplate( )" method that the "addLabel" method should be invoked, passing in the new "TextLabelDesignElement," which will append the new SVG node to the SVG DOM tree.

Overriding Existing Bindings

According to one embodiment of the invention, the binding document can define one binding that overrides another binding previously defined in the binding document. For example:

```
<template id="OverriddenBoxLabelTemplate">
    <bind template-ref="BoxLabelTemplate" svg-ref="MyBoxLabel"
        class="MyTextLabelDesignElement"/>
</template>
```

The above binding creates an instance of "BoxLabelTemplate." However, instead of referencing "BoxLabel" and creating an instance of "TextLabelDesignElement" as specified by "BoxLabelTemplate," the above binding causes the "MyBoxLabel" SVG element to be referenced and an instance of "MyTextLabelDesignElement" to be created.

In one embodiment of the invention, the binding language is extensible. Customized attributes can be added to the "<bind>" elements to add customized binding behaviors. In such an embodiment, the binding facility invokes a "setBindingAttributes( )" method on the design element, passing a "Binding" instance, which can be queried to return attributes in a corresponding "<bind>" element. The "setBindingAttributes( )" method on a design element can be overridden to process customized attribute extensions.

Example Flow

Figure 1:
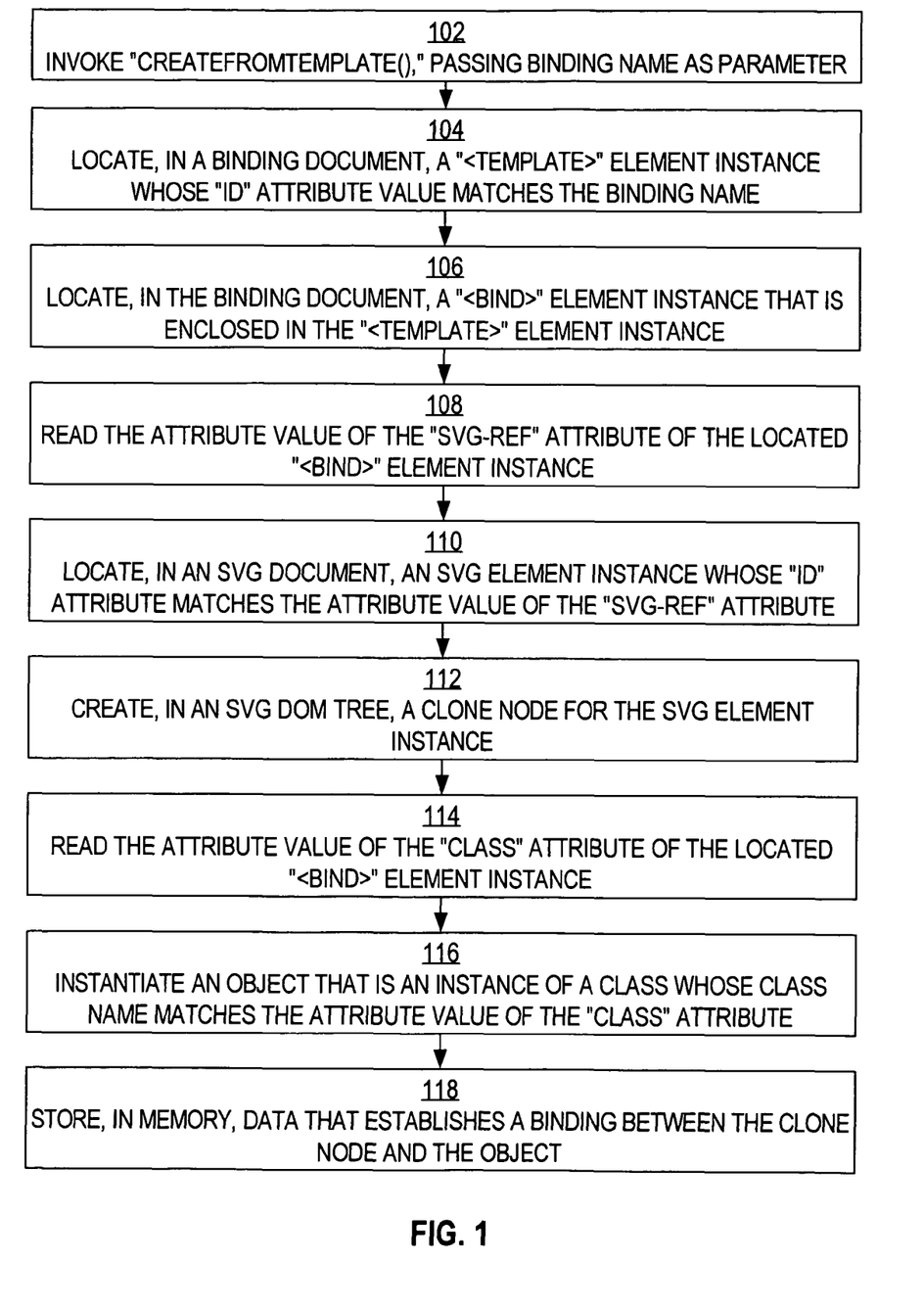
FIG. 1 is a flow diagram that illustrates an example of a technique in which clone SVG nodes are bound to JAVA objects using a binding language, according to an embodiment of the invention.

FIG. 1 is a flow diagram that illustrates an example of a technique in which clone SVG nodes are bound to JAVA objects using a binding language, according to an embodiment of the invention. Such a technique may be performed automatically by an executing computer program (i.e., a process), for example. Other embodiments of the invention may comprise more or fewer steps than those shown in the example below.

In block 102, a "createFromTemplate( )" method of an "AbstractDesignView" object is invoked. A name of a binding, defined in a binding document, is passed as a parameter in the method invocation. For example, an application program may invoke the "createFromTemplate( )" method and pass to the method, as a parameter, the binding name "BoxLabelTemplate."

In block 104, in response to the method invocation, the "createFromTemplate( )" method locates, in the binding document, a "<template>" element instance whose "id" attribute value matches that name that was passed to the method as a parameter. Continuing the example, the "createFromTemplate( )" method may locate, in the binding document, a "<template id='BoxLabelTemplate'>" element.

In block 106, the "createFromTemplate( )" method locates a "<bind>" element instance that is enclosed within the <template>" element located in block 104. Continuing the example, the "createFromTemplate( )" method may locate, in the binding document, a "<bind svg-ref='BoxLabel' class='TextLabelDesignElement'>" element instance.

In block 108, the "createFromTemplate( )" method reads the attribute value of the "svg-ref" attribute of the "<bind>" element instance located in block 106. Continuing the example, the "createFromTemplate( )" method may read "BoxLabel" as the attribute value of the "svg-ref" attribute of the "<bind>" element instance located in block 106.

In block 110, the "createFromTemplate( )" method locates, in an SVG document to which the binding document refers, an SVG element instance whose "id" attribute value matches the svg-ref value read in block 108. Continuing the example, the "createFromTemplate( )" method may locate, in the SVG document, a "<g id='BoxLabel'>" SVG element instance.

In block 112, the "createFromTemplate( )" method creates, in the SVG DOM tree, a "clone" node for the SVG element instance located in block 110. Continuing the example, the "createFromTemplate( )" method may create, in an SVG DOM tree, a clone of an SVG node for the "<g id='BoxLabel'>" element instance. In one embodiment of the invention, the creation of the clone SVG node in the SVG DOM tree causes a display to be updated to show a new shape that the clone SVG node represents. The new shape has the characteristics indicated by the SVG element instance based upon which the clone SVG node was created.

In block 114, the "createFromTemplate( )" method reads the attribute value of the "class" attribute of the "<bind>" element instance located in block 106. Continuing the example, the "createFromTemplate( )" method may read "TextLabelDesignElement" as the attribute value of the "class" attribute of the "<bind>" element instance located in block 106.

In block 116, the "createFromTemplate( )" method instantiates an object that is an instance of the class whose class name matches the class value read in block 114. Continuing the example, the "createFromTemplate( )" method may instantiate an object that is an instance of the "TextLabelDesignTemplate" class. In one embodiment of the invention, when the object is instantiated, the "createFromTemplate( )" method automatically invokes an "initialize( )" method of that object. The "initialize( )" method may alter attributes of the clone SVG node that corresponds to the object, thereby causing the display to be updated automatically to reflect the alterations.

In block 118, the "createFromTemplate( )" method stores, in memory, data that establishes an association, or binding, between (a) the clone SVG node created in block 112 and (b) the object instantiated in block 116. For example, the "createFromTemplate( )" method may store data that establishes a binding between (a) the clone SVG node of the "BoxLabel" SVG element instance and (b) the "TextLabelDesignElement" object. Separate instances of the "TextLabelDesignElement" object may be bound to separate SVG nodes in the SVG DOM tree.

Hardware Overview

Figure 2:
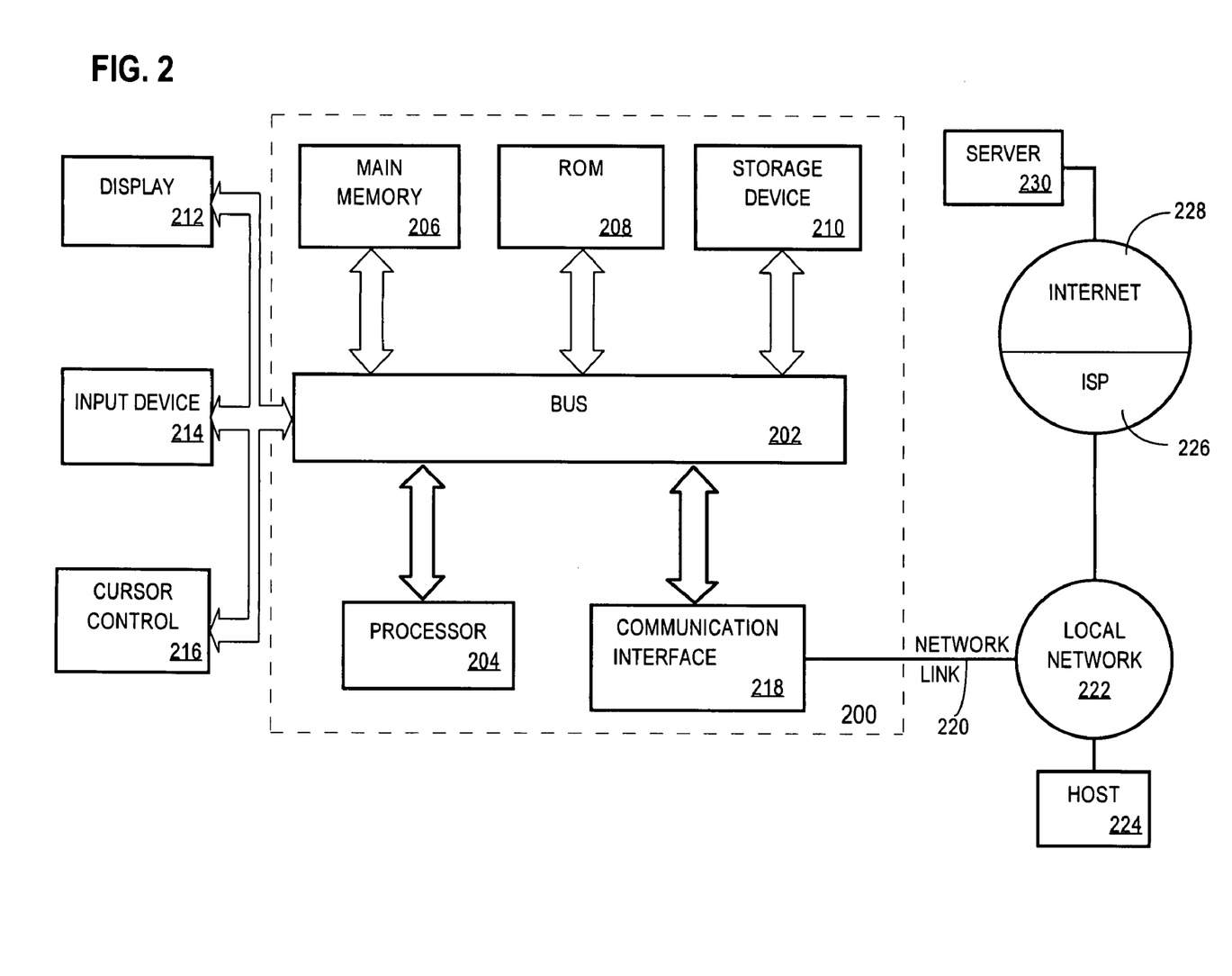
FIG. 2 is a hardware block diagram of an example computer entity, upon which certain embodiments of the invention may be implemented.

FIG. 2 is a block diagram that illustrates a computer system 200 upon which an embodiment of the invention may be implemented. Computer system 200 includes a bus 202 for facilitating information exchange, and one or more processors 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions by processor 204. Computer system 200 may further include a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

In computer system 200, bus 202 may be any mechanism and/or medium that enables information, signals, data, etc., to be exchanged between the various components. For example, bus 202 may be a set of conductors that carries electrical signals. Bus 202 may also be a wireless medium that carries wireless signals between one or more of the components. Bus 202 may also be a medium that enables signals to be capacitively exchanged between one or more of the components. Bus 202 may further be a network connection that connects one or more of the components. Overall, any mechanism and/or medium that enables information, signals, data, etc., to be exchanged between the various components may be used as bus 202.

Bus 202 may also be a combination of these mechanisms/media. For example, processor 204 may communicate with storage device 210 wirelessly. In such a case, the bus 202, from the standpoint of processor 204 and storage device 210, would be a wireless medium, such as an electromagnetic wave. Further, processor 204 may communicate with ROM 208 capacitively. In this instance, the bus 202 would be the medium that enables this capacitive communication to take place. Further, processor 204 may communicate with main memory 206 via a network connection. In this case, the bus 202 would be the network connection. Further, processor 204 may communicate with display 212 via a set of conductors. In this instance, the bus 202 would be the set of conductors. Thus, depending upon how the various components communicate with each other, bus 202 may take on different forms. Bus 202, as shown in FIG. 2, functionally represents all of the mechanisms and/or media that enable information, signals, data, etc., to be exchanged between the various components.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

Processor 204 may execute the received code as the code is received and/or stored in storage device 210 or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for binding program-defined objects to Document Object Model (DOM) nodes, the method comprising:

receiving a request to create a scalable vector graphics (SVG) element instance from an SVG element template, wherein the request comprises a binding name, and wherein the SVG element instance comprises an extensible markup language (XML) code for describing two-dimensional graphics;

selecting, from a binding document, the SVG element template using the binding name, wherein the binding document comprises an association between the SVG element template, a node in a SVG DOM tree, and a software object class, wherein the association is written in XML;

obtaining, from the binding document, a software object class identifier, wherein the software object class identifier indicates the software object class associated with the SVG element template;

obtaining, from the binding document, a node reference indicating the node in the SVG DOM tree associated with the SVG element template;

selecting, in the SVG DOM tree, the node that corresponds to the SVG element template using the node reference;

creating, in the SVG DOM tree, a clone of the selected node for the SVG element instance;

instantiating, in response to the creating, a software object instance of the software object class; and storing data that indicates a binding between the software object instance and the clone.

2. The method of claim 1, wherein the binding document comprises one or more binding expressions that are expressed as XML elements.

3. The method of claim 1, wherein said creating of the clone causes a display to show a shape that corresponds to the clone.

4. The method of claim 1, further comprising:

invoking, in response to said instantiating, a particular method of the software object class that alters one or more attributes of the clone, wherein, when the one or more attributes are altered, a display that shows a shape that corresponds to the clone is automatically updated to reflect alterations in the one or more attributes.

5. The method of claim 1,
wherein the request to create the SVG element instance is an invocation of a creation method, and
wherein the binding name is passed as a parameter of the creation method.

6. The method of claim 5, wherein selecting the SVG element template from the binding document comprises:
locating, in the binding document, a "template" element instance whose "id" attribute value matches the binding name; and
locating, in the binding document, a "bind" element instance that is enclosed within the "template" element instance.

7. The method of claim 6,
wherein obtaining the node reference comprises:
reading an attribute value of an "svg-ref" attribute of the "bind" element instance; and
locating, in an SVG document, an SVG element instance whose "id" attribute value matches the attribute value of the "svg-ref" attribute.

8. The method of claim 6,
wherein obtaining the software object class identifier comprises:
reading an attribute value of a "class" attribute of the "bind" element instance;
wherein instantiating the software object instance comprises instantiating the software object instance from a JAVA class whose class name matches the attribute value of the "class" attribute.

9. The method of claim 6,
wherein selecting obtaining the node reference comprises:
reading an attribute value of an "svg-ref" attribute of the "bind" element instance; and
locating, in an SVG document, an SVG element instance whose "id" attribute value matches the attribute value of said "svg-ref" attribute;
wherein obtaining the software object class identifier comprises:
reading an attribute value of a "class" attribute of the "bind" element instance; and
wherein instantiating the software object instance comprises instantiating the software object instance from a JAVA class whose class name matches the attribute value of the "class" attribute.

10. The method of claim 1, wherein the binding document indicates at least one binding between (a) another binding defined in the binding document and (b) an invocable method of a JAVA class.

11. The method of claim 1, further comprising:
reading an updated version of the binding document in which one or more attributes have been added to a "<bind>" element in the binding document; and
invoking a "setBindingAttributes( )" method of the object, wherein invoking the "setBindingAttributes( )" method includes passing, as a parameter to the "setBindingAttributes( )" method, a "Binding" instance that can be queried to return attributes in the "<bind>" element.

12. The method of claim 11, further comprising:
overriding the "setBindingAttributes( )" method to process customized attribute extensions.

13. A non-transitory machine-readable medium carrying one or more sequences of instructions, which instructions, when executed by one or more processors, cause the one or more processors to carry out steps comprising:
receiving a request to create a scalable vector graphics (SVG) element instance from an SVG element template, wherein the request comprises a binding name, and wherein the SVG element instance comprises an extensible markup language (XML) code for describing two-dimensional graphics;
selecting, from a binding document, the SVG element template using the binding name, wherein the binding document comprises an association between the SVG element template, a node in a SVG DOM tree, and a software object class, wherein the association is written in XML;
obtaining, from the binding document, a software object class identifier associated with the SVG element template, wherein the software object class identifier indicates a software object class;
obtaining, from the binding document, a node reference indicating the node in the SVG DOM tree associated with the SVG element template;
selecting, in the SVG DOM tree, the node that corresponds to the SVG element template using the node reference;
creating, in the SVG DOM tree, a clone of the selected node for the SVG element;
instantiating, in response to the creating, a software object instance of the software object class; and
storing data that indicates a binding between the software object instance and the clone.

14. The non-transitory machine-readable medium of claim 13, wherein the binding document comprises one or more binding expressions that are expressed as XML elements.

15. The non-transitory machine-readable medium of claim 13, wherein said creating of the clone causes a display to show a shape that corresponds to the clone.

16. The non-transitory machine-readable medium of claim 13, wherein said steps further comprise:
invoking, in response to said instantiating, a particular method of the software object class that alters one or more attributes of the clone,
wherein, when the one or more attributes are altered, a display that shows a shape that corresponds to the clone is automatically updated to reflect alterations in the one or more attributes.

17. The non-transitory machine-readable medium of claim 13,
wherein the request to create the SVG element instance is an invocation of a creation method, and
wherein the binding name is passed as a parameter of the creation method.

18. The non-transitory machine-readable medium of claim 17, wherein selecting the SVG element template from the binding document comprises:
locating, in the binding document, a "template" element instance whose "id" attribute value matches the binding name; and
locating, in the binding document, a "bind" element instance that is enclosed within the "template" element instance.

19. The non-transitory machine-readable medium of claim 18,
wherein obtaining the node reference comprises:
reading an attribute value of an "svg-ref" attribute of the "bind" element instance; and
locating, in an SVG document, an SVG element instance whose "id" attribute value matches the attribute value of the "svg-ref" attribute.

20. The non-transitory machine-readable medium of claim 18,
wherein obtaining the software object class identifier comprises:
reading an attribute value of a "class" attribute of the "bind" element instance;
wherein instantiating the software object instance comprises instantiating the software object instance from a JAVA class whose class name matches the attribute value of the "class" attribute.

21. The non-transitory machine-readable medium of claim 18,
wherein obtaining the node reference comprises:
reading an attribute value of an "svg-ref" attribute of the "bind" element instance; and
locating, in an SVG document, an SVG element instance whose "id" attribute value matches the attribute value of said "svg-ref" attribute;
wherein obtaining the software object class identifier comprises:
reading an attribute value of a "class" attribute of the "bind" element instance; and
wherein instantiating the software object instance comprises instantiating the software object instance from a JAVA class whose class name matches the attribute value of the "class" attribute.

22. The non-transitory machine-readable medium of claim 13, wherein the binding document indicates at least one binding between (a) another binding defined in the binding document and (b) an invocable method of a JAVA class.

23. The non-transitory machine-readable medium of claim 13, wherein said steps further comprise:
reading an updated version of the binding document in which one or more attributes have been added to a "<bind>" element in the binding document; and
invoking a "setBindingAttributes( )" method of the object, wherein invoking the "setBindingAttributes( )" method includes passing, as a parameter to the "setBindingAttributes( )" method, a "Binding" instance that can be queried to return attributes in the "<bind>" element.

24. the machine-readable medium of claim 23, wherein said steps further comrpise: overriding the "setBinding attributes( )" method to process customized attribute extension.

* * * * *

UNITED STATES PATENT AND TRADEMARK OFFICE
CERTIFICATE OF CORRECTION

PATENT NO. : 7,962,895 B2  
APPLICATION NO. : 11/490651  
DATED : June 14, 2011  
INVENTOR(S) : Peter T. Liu Page 1 of 1

It is certified that error appears in the above-identified patent and that said Letters Patent is hereby corrected as shown below:

In Claim 24, Column 16 (line 19), "the machine-readable" should read as
--The non-transitory machine-readable--.

In Claim 24, Column 16 (line 20), "comrpise" should read as
--comprise--.

In Claim 24, Column 16 (lines 20 & 21), "setBinding attributes( )" should read as
--"setBindingAttributes( )"--.

Signed and Sealed this
Eighth Day of November, 2011

David J. Kappos
*Director of the United States Patent and Trademark Office*